United States Patent [19]

Bailey

[11] Patent Number: 5,266,778
[45] Date of Patent: Nov. 30, 1993

[54] DYNAMIC TEMPERATURE CONTROL FOR USE WITH A HEATING AND/OR COOLING SYSTEM INCLUDING AT LEAST ONE TEMPERATURE SENSOR

[75] Inventor: David F. Bailey, Riverview, Fla.

[73] Assignee: Hollister, Inc., Libertyville, Ill.

[21] Appl. No.: 891,427

[22] Filed: May 29, 1992

[51] Int. Cl.$^5$ .............................................. H05B 1/02
[52] U.S. Cl. ...................... 219/497; 219/494; 219/508; 219/501; 340/589; 607/104
[58] Field of Search ............... 219/497, 501, 508, 509, 219/494, 506, 212, 490; 128/400; 340/588, 589

[56] References Cited
U.S. PATENT DOCUMENTS

| | | | |
|---|---|---|---|
| 3,594,546 | 7/1971 | Smillie | 219/501 |
| 3,967,627 | 7/1976 | Brown | 128/400 |
| 4,459,468 | 7/1984 | Bailey | 219/490 |
| 4,459,469 | 7/1984 | Ishima | 219/497 |
| 4,852,544 | 8/1989 | Williams et al. | 219/490 |
| 5,041,809 | 8/1991 | Payne et al. | 219/505 |

Primary Examiner—Mark H. Paschall
Attorney, Agent, or Firm—A. W. Fisher, III

[57] ABSTRACT

A dynamic temperature control to selectively generate one of a plurality of discrete voltage level temperature control signals for use with a fluid circulating system operable in a heating or cooling state including a control panel to select the system operating parameters including operating temperature of the fluid and at least one temperature sensor, the dynamic temperature control comprises logic circuitry to receive temperature input signals from the control panel and temperature sensor and to generate one of the plurality of discrete voltage level temperature control signals proportional to the difference between the input signals from the control panel and the temperature sensor to control the operating temperature of the fluid circulated through the fluid circulating system.

2 Claims, 10 Drawing Sheets

DYNAMIC TEMPERATURE CONTROL FOR USE WITH A HEATING AND/OR COOLING SYSTEM INCLUDING AT LEAST ONE TEMPERATURE SENSOR

BACKGROUND OF THE INVENTION

1. Field of the Invention

A dynamic temperature control system for use with a fluid circulating system to control the temperature of fluid circulated therethrough.

2. Description of the Prior Art

Thermal blankets and heating pads are well known in the art. Such thermal blankets commonly include either a cooling or heating effect. Generally heating blankets or pads incorporated the use of electrical resistance elements disposed thereout the area of the blanket. Similarly cold applicator pads or blankets used in the medical field frequently include a flexible plastic package containing two chemicals which when mixed together absorb heat. The chemicals are frequently packaged on either side of a rupturable membrane so that application of pressure to the exterior package ruptures the membrane and causes the fluids to mix and produces the heat absorbing reaction. Alternately, cooling pads may be used in combination with a compressor, refrigerant condensation and evaporator coils. It is obvious that this type cold pads or blankets are heavy and cumbersome.

Various efforts have been made to provide means to automatically heat or cool such thermal blankets or pads.

U.S. Pat. No. 3,967,627 shows an apparatus for selectively heating or cooling comprising a source of heat transferring liquid, an applicator pad adapted to be applied to an area including means defining a conduit for carrying the liquid through the pad, heat exchanger means to receive the liquid including thermoelectric diode means for producing heat when an electrical potential of one polarity is applied thereto and for absorbing heat when an electrical potential of the opposite polarity is applied thereto, pump means for pumping the liquid from the source through the heat exchanger means and the applicator pad and control circuit means including temperature-sensitive means responsive to the temperature of the liquid for controlling the polarity and duration of application of an electrical potential to the thermoelectric diode means under operator control. The apparatus wherein the temperature-sensitive means of the control circuit means comprises thermistor means arranged to sense the temperature of the liquid just prior to its entry into the heat exchanger means including adjustable resistive circuit means connected in circuit with the thermistor means controlled by an operator for generating a control signal representative of a difference between a desired operating temperature and the actual temperature of the liquid and semiconductor switch means responsive to the control signal for controlling the application of electrical energy to the thermoelectric diode means for bringing the temperature of the liquid to the desired operating temperature for the system.

U.S. Pat. No. 4,459,468 discloses a circulating system capable of producing both a heated and cooled fluid of various temperatures circulated to the thermal blanket at the desired "hot" or "cold" temperature. The system comprises a reservoir and a temperature transfer means to heat or cool fluid within the reservoir. A temperature sensor monitors the fluid temperature in the reservoir. A temperature control means is electrically connected in current regulating and activating relation to the temperature transfer means such that a continuous path of information flows between the monitored fluid and temperature control means and to the thermal modules for activation thereof in order to maintain the desired temperature.

U.S. Pat. No. 5,051,562 teaches a temperature controlled fluid circulating system for use with a fluid circulating system selectively operable in a first or second selected operating mode including at least one thermal module operable in heating or cooling state to monitor and control the temperature of fluid circulated through a remote liquid circulation manifold. The fluid circulating system comprises a display/control panel to select the system operating parameters including a selected operating temperature set point and a first sensor to sense the temperature of the fluid including means to generate a first temperature signal corresponding to the temperature of the fluid and a second sensor displaced adjacent the remote liquid circulation manifold including means to generate a second temperature signal corresponding to the temperature adjacent the remote liquid circulation manifold and a micro control including logic circuitry to receive signals from the display/control panel and the first and second temperature signals from the first and second temperature sensors respectively and to selectively generate thermal module control signals to control the heating or cooling of the thermal module by comparing the selected operating temperature set point with the temperature sensed by the first sensor when operating in the first selected operating mode to selectively generate the thermal module control signals and by comparing the selected operating temperature set point with the temperature sensed by the second sensor when operating in the second selected operating mode to selectively generate the thermal module control signals, the temperature controlled fluid circulating system further operable in an alternate operating mode wherein the logic circuitry further includes an alternate operating mode logic means such that the temperature controlled fluid circulation system operates in the alternate operating mode when in the second selected operating mode and the second temperature signal exceeds a first predetermined temperature range.

SUMMARY OF THE INVENTION

The present invention relates to a dynamic temperature control for use with a fluid circulating system similar to the temperature control fluid circulating system disclosed in U.S. Pat. No. 4,459,468 and U.S. Pat. No. 5,051,562.

The fluid circulating system may comprise a fluid reservoir coupled to a pump and a thermal blanket or similar remote liquid circulation manifold to selectively circulate fluid to and from the remote liquid circulating manifold. The operation of thermal modules, disposed in thermal transfer relationship with the fluid reservoir, is controlled by a micro control and a display/control panel. The fluid circulating system further includes a remote temperature sensor including means to generate a remote temperature signal corresponding to the temperature at the remote site and a fluid temperature sensor including means to generate a fluid temperature signal corresponding to the fluid temperature is operatively disposed in heat exchange relation relative to the fluid reservoir.

The dynamic temperature control comprises a temperature state controller and a bipolar multilevel power supply operatively coupled to the fluid circulating system to receive a temperature set point signal corresponding to the desired temperature set point and a sensor temperature signal from either the fluid temperature sensor or remote temperature sensor.

The temperature state controller and bipolar multilevel power supply include logic circuitry to selectively generate one of a plurality of heating or cooling signals proportional to the difference between the sensor temperature signal and the temperature set point signal.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts through the several views of the drawings.

DETAILED DESCRIPTION OF THE PREFERRED EMBODIMENT

The present invention relates to a dynamic temperature control to of selectively generating one of a plurality of discrete voltage level temperature control signals for use with a fluid circulating system similar to the temperature control fluid circulating system disclosed in U.S. Pat. No. 4,459,468 and U.S. Pat. No. 5,051,562. By adjusting the voltage level fed to the thermal modules, thermal stress is significantly reduced.

The fluid circulating system may comprise a fluid reservoir coupled to a pump and a thermal blanket or similar remote liquid circulation manifold to selectively circulate fluid to and from the remote liquid circulating manifold. The heating and cooling of the thermal modules, disposed in thermal transfer relationship with the fluid reservoir, is controlled by the dynamic temperature control. The fluid circulating system further includes a remote temperature sensor including means to generate a digitized remote temperature signal corresponding to the temperature at the remote site and a fluid temperature sensor including means to generate a digitized fluid temperature signal corresponding to the fluid temperature within the fluid reservoir.

Figure 1:
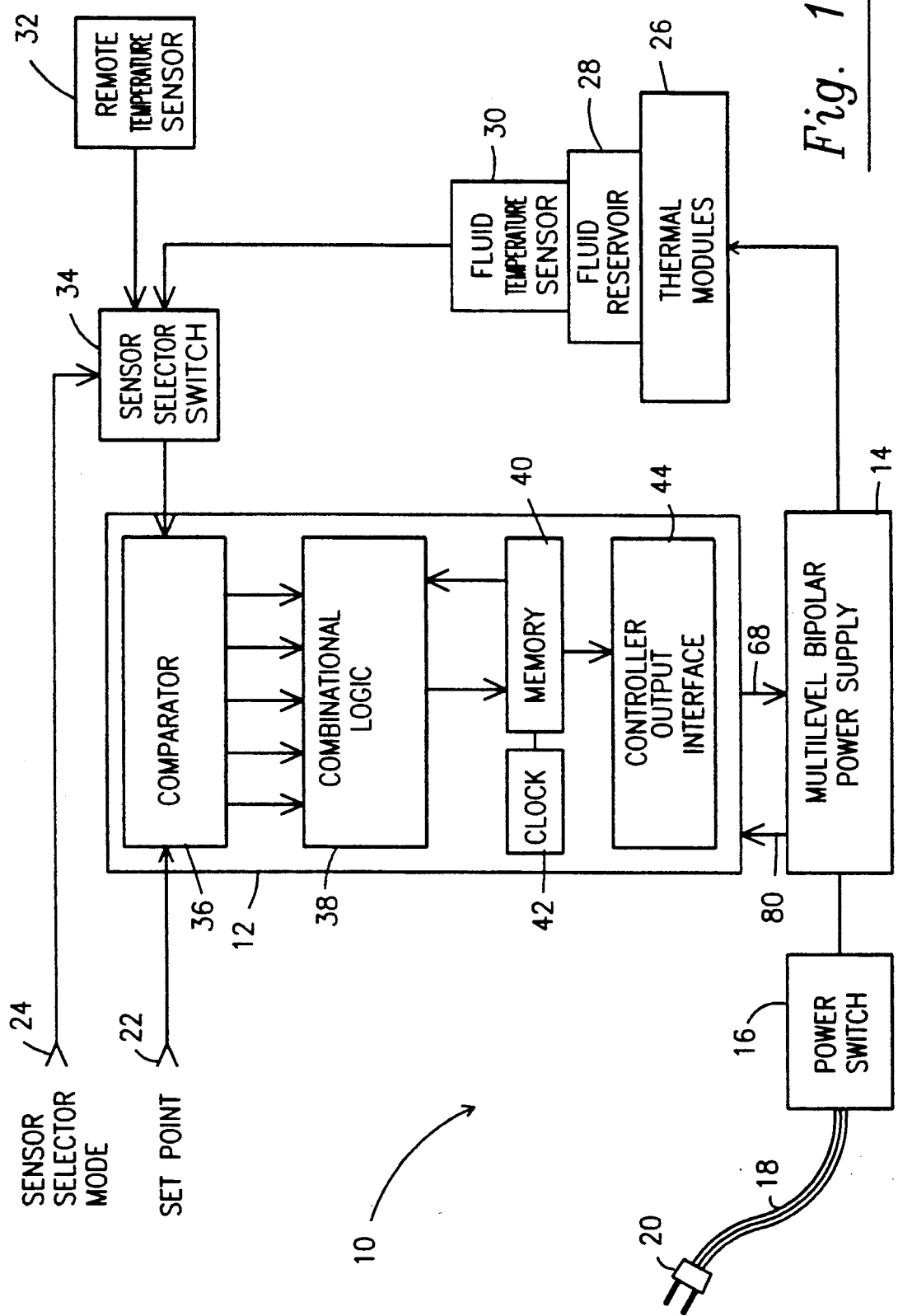
FIG. 1 is a schematic block diagram of the dynamic temperature control of the present invention.

As shown in FIG. 1, the dynamic temperature control generally indicated as 10 comprises a temperature state controller 12 and a bipolar multilevel power supply coupled to an external AC power supply (not shown) through a power switch 16, a conductor 18 and a connector plug 20, and to the fluid circulating system as described more fully hereinafter. FIG. 1 also diagrammatically shows pertinent elements or components of the fluid circulating system. Specifically, the control panel (not shown) includes a temperature set point control 22 to select the desired operating temperature and a sensor selector mode control 24 to select the desired sensor mode; that is, fluid sensor mode or remote sensor mode. The thermal modules, fluid reservoir, fluid temperature sensor, remote temperature sensor and a sensor selector switch are shown as 26, 28, 30, 32 and 34 respectively.

As shown in FIG. 1, the temperature state controller 12 comprises a comparator 36, combinational logic 38, state memory 40, system clock 42 and controller output interface 44.

The sensor selector mode control 24 selects either the remote sensor mode or fluid sensor mode thereby controlling the output of the sensor selector switch 34 fed to the comparator 36 of the temperature state controller 12. Specifically, when operating in fluid sensor mode fluid temperature signals from the fluid temperature sensor 30 are fed through the sensor selector switch 34 and when operating in the remote sensor mode remote temperature signals from the remote temperature sensor 32 are fed through the sensor selector switch 34.

Figure 2:
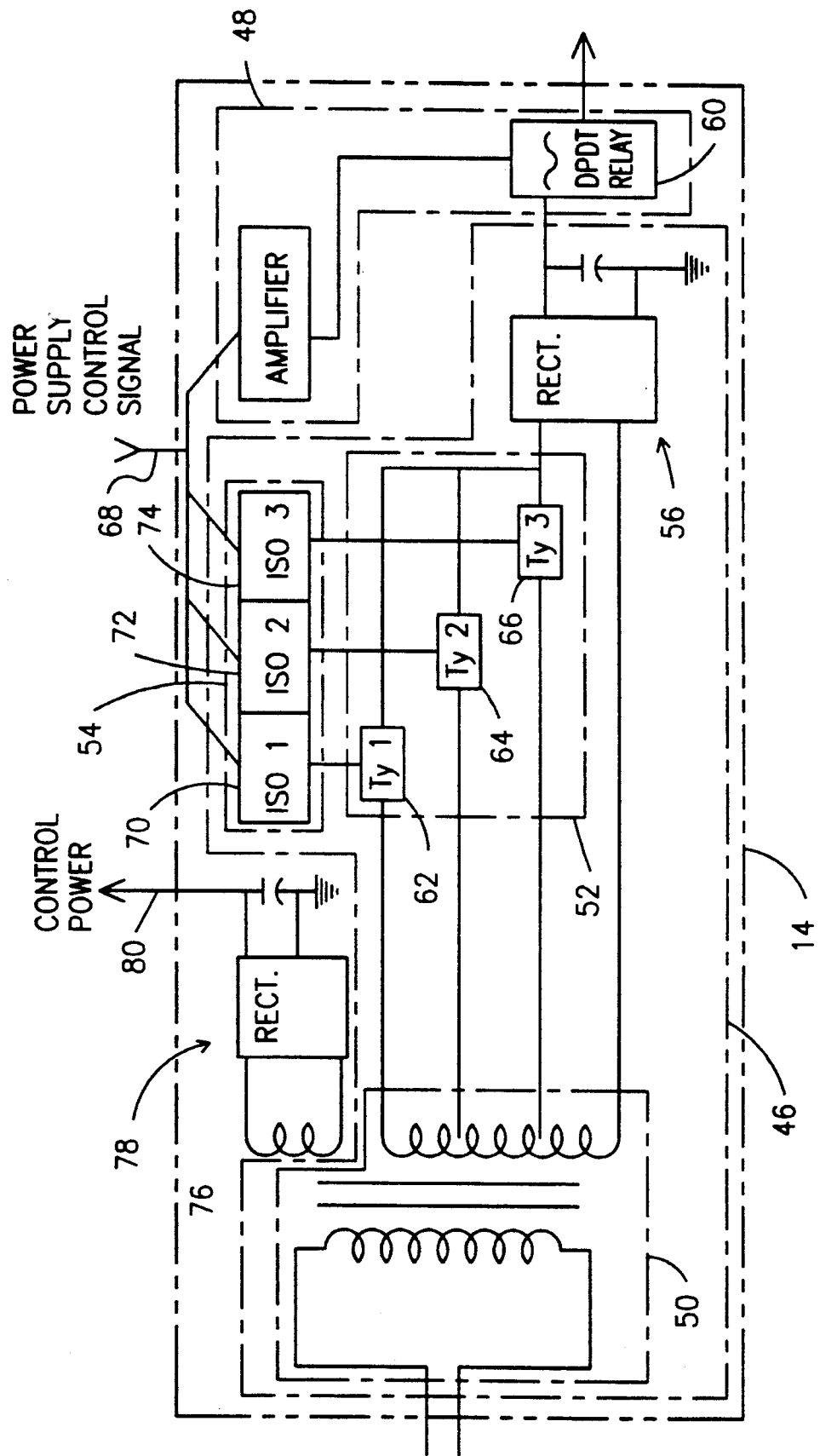
FIG. 2 is a circuit diagram of the multilineal bipolar power supply of the present invention.

As shown in FIG. 2, the multilevel bipolar power supply 14 comprises a multilevel voltage power supply section generally indicated as 46 to selectively generate one of a plurality of discrete voltage level signals and a bipolar switching section generally indicated as 48 to selectively generate a heating or cooling signal. The multilevel power supply section 46 comprises a transformer generally indicated as 50, a multilevel power supply control means generally indicated as 52, an isolation means generally indicated as 54 and a rectifier means 56. The bipolar switching section 48 comprises an amplifier 58 and a double pole, double throw relay or HEAT/COOL state control means 60. The multilevel voltage power supply control means 52 comprises a first, second and third electronic switch indicated as 62, 64 and 66 respectively coupled to the power supply control signal line or conductor 68 by a corresponding first, second and third voltage isolators indicated as 70, 72 and 74 respectively which collectively form the isolation means 54 to receive the power supply control signals from the temperature state controller 12. Signals from the temperature state controller 12 turn the electronic switches 62, 64 and 66 on and off to feed different voltage levels to the multilevel bipolar power supply 14. Control power from a secondary winding 76 is fed through a rectifier 78 and control power conductor 80 to the temperature state controller 12.

The dynamic temperature control 10 is a means of using a multiple discrete level power supply to optimally control the thermal load with a thermoelectric heat exchanger or thermal module 26.

The dynamic temperature control 10 is capable of delivering seven (7) discrete voltages.

| LEVEL | VOLTAGE |
|-------|---------|
| +3    | +45     |
| +2    | +35     |
| +1    | +24     |
| 0     | 0       |
| −1    | −24     |
| −2    | −35     |
| −3    | −45     |

The 0 level provides a float condition that does not sink or source current at the thermal modules 26.

For reference hereinafter, the definitions for the symbols used are:

| | |
|---|---|
| Tsol Tsolution | temperature of the solution |
| Tsen Tsensor | temperature of remote sensor |
| Tset | temperature of the Set Point |
| dT | Delta Temperature (temperature error) dT = Tsol - Tset or dT = Tsen - Tset or dT = Tsol-105 or dT = Tsol-40 |
| Tr | rate of temperature change per unit of time. The tu = 15 seconds (may change when tuning actual system). Tr = Tsol (n-1) - Tsol (n) or Tr = Tsen (n-1) - Tsen (n) |
| tv | Time delay between power supply step changes. The duration should be 15 seconds. |

FIGS. 3 through 9 show the operational sequence of the logic circuitry of the dynamic temperatore control 10.

Figure 3:
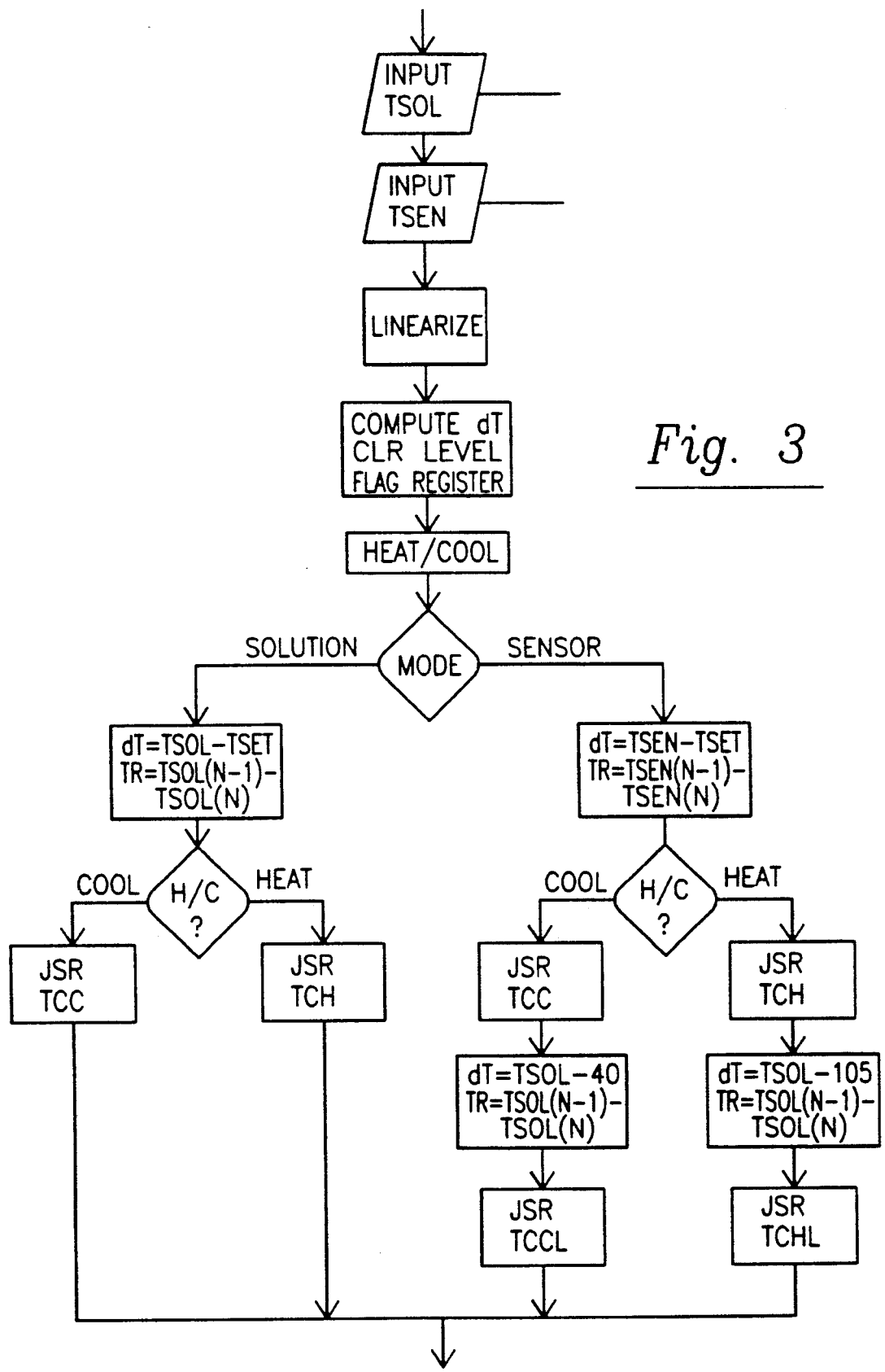
FIGS. 3 and 4 depict the operational sequence of the logic circuitry of the dynamic temperature control.
Figure 4:
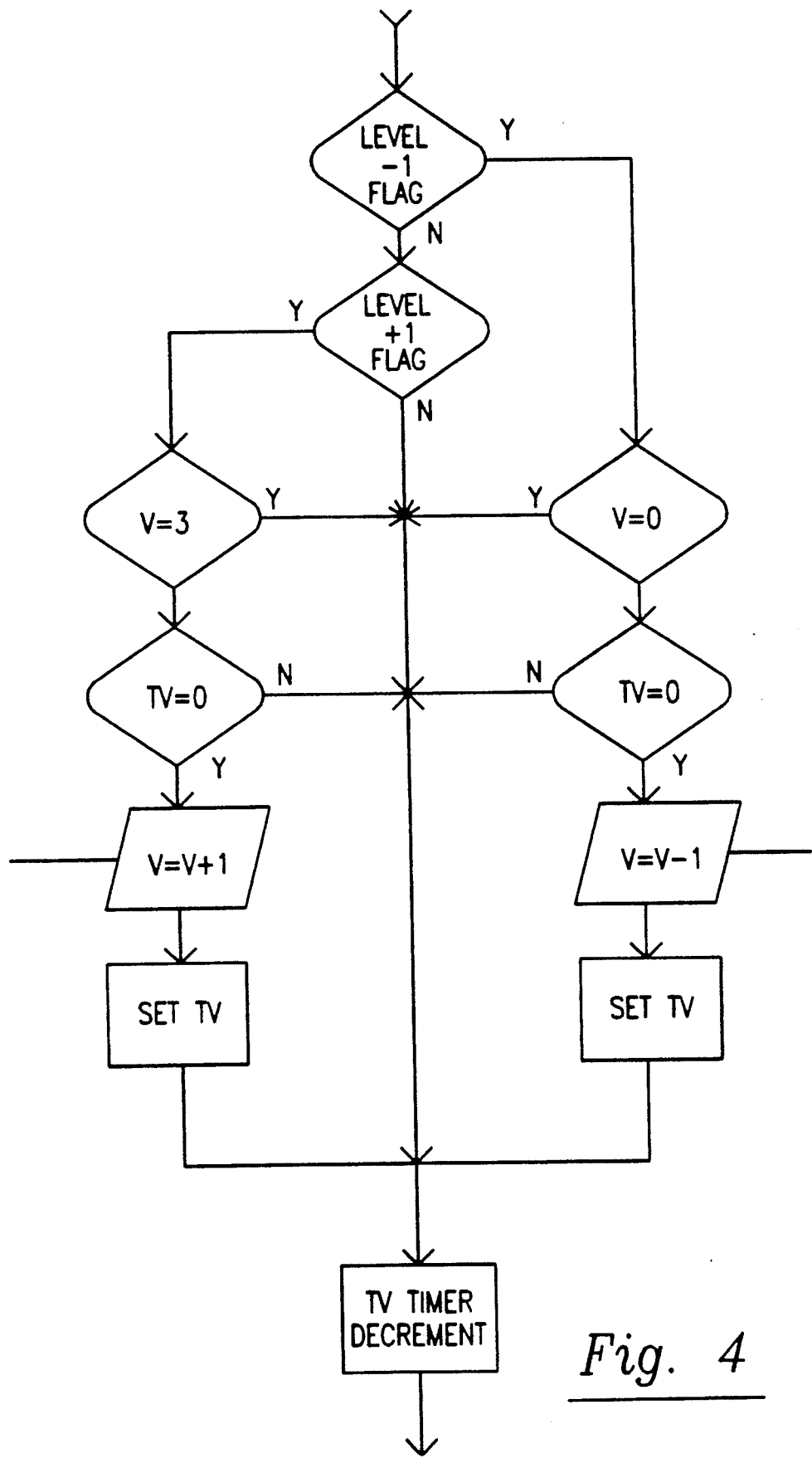

Specifically, FIGS. 3 and 4 show the overall logic sequence of the dynamic temperature control 10. The temperature sensed by the fluid temperature sensor 30 and remote temperature sensor 32 are fed through the sensor selector switch 34 to the comparator 36.

Figure 5:
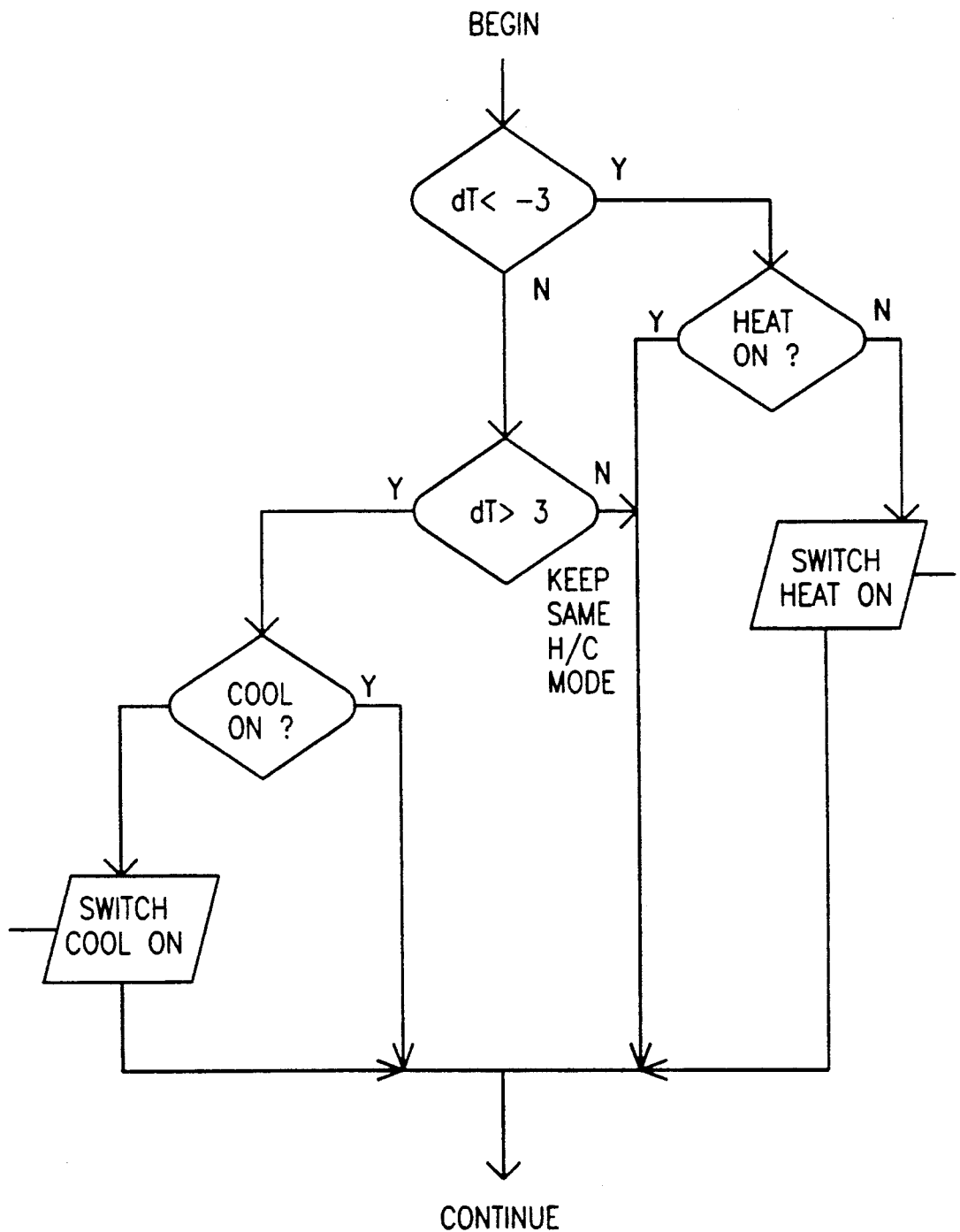
FIG. 5 is depicts the operational sequence of the logic circuitry of the HEAT/COOL state switching.
Figure 6:
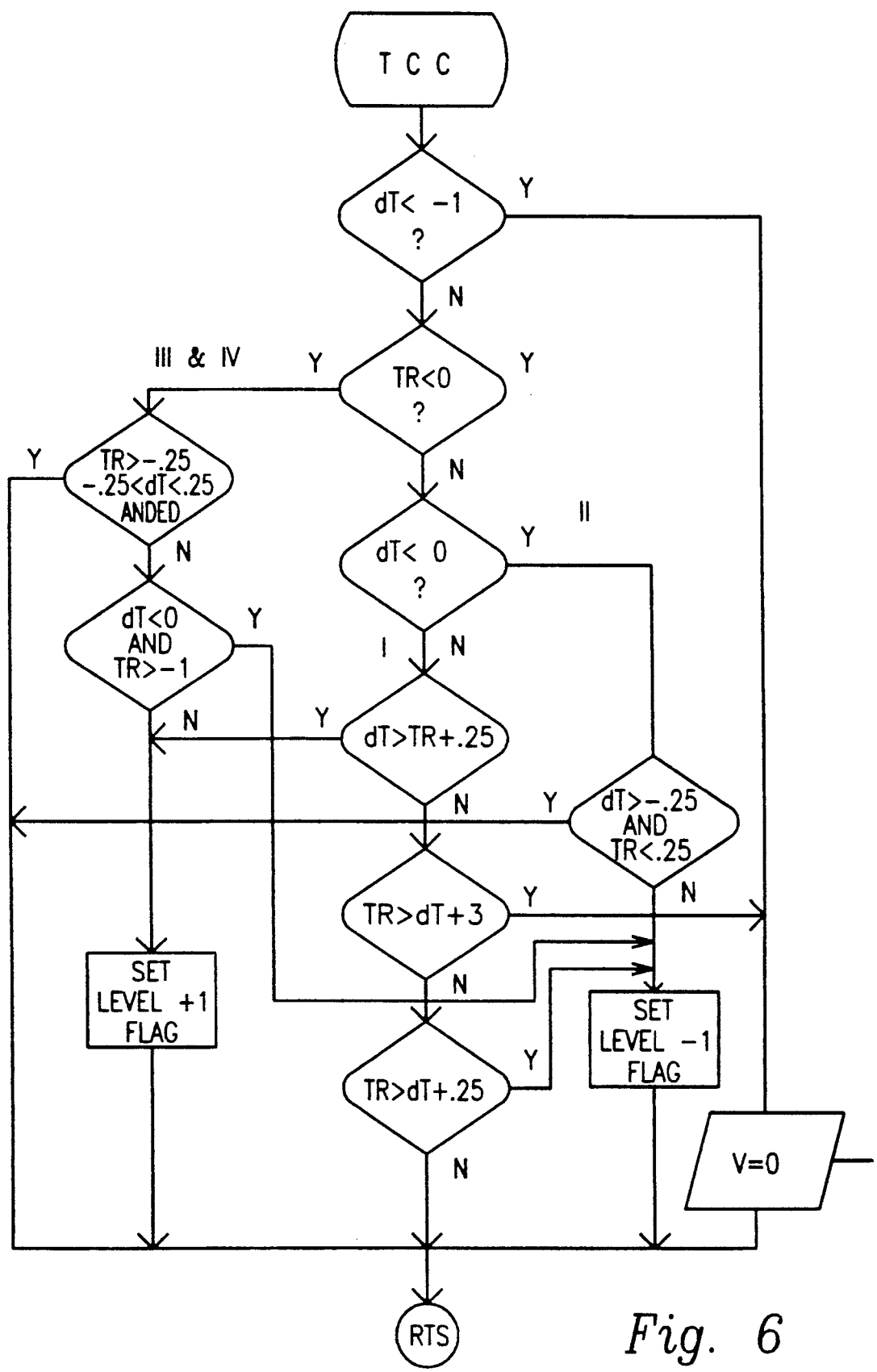
FIG. 6 is depicts the operational sequence of the logic circuitry for generating the temperature control signal when operating in the COOL state signal generation in the solution mode.
Figure 7:
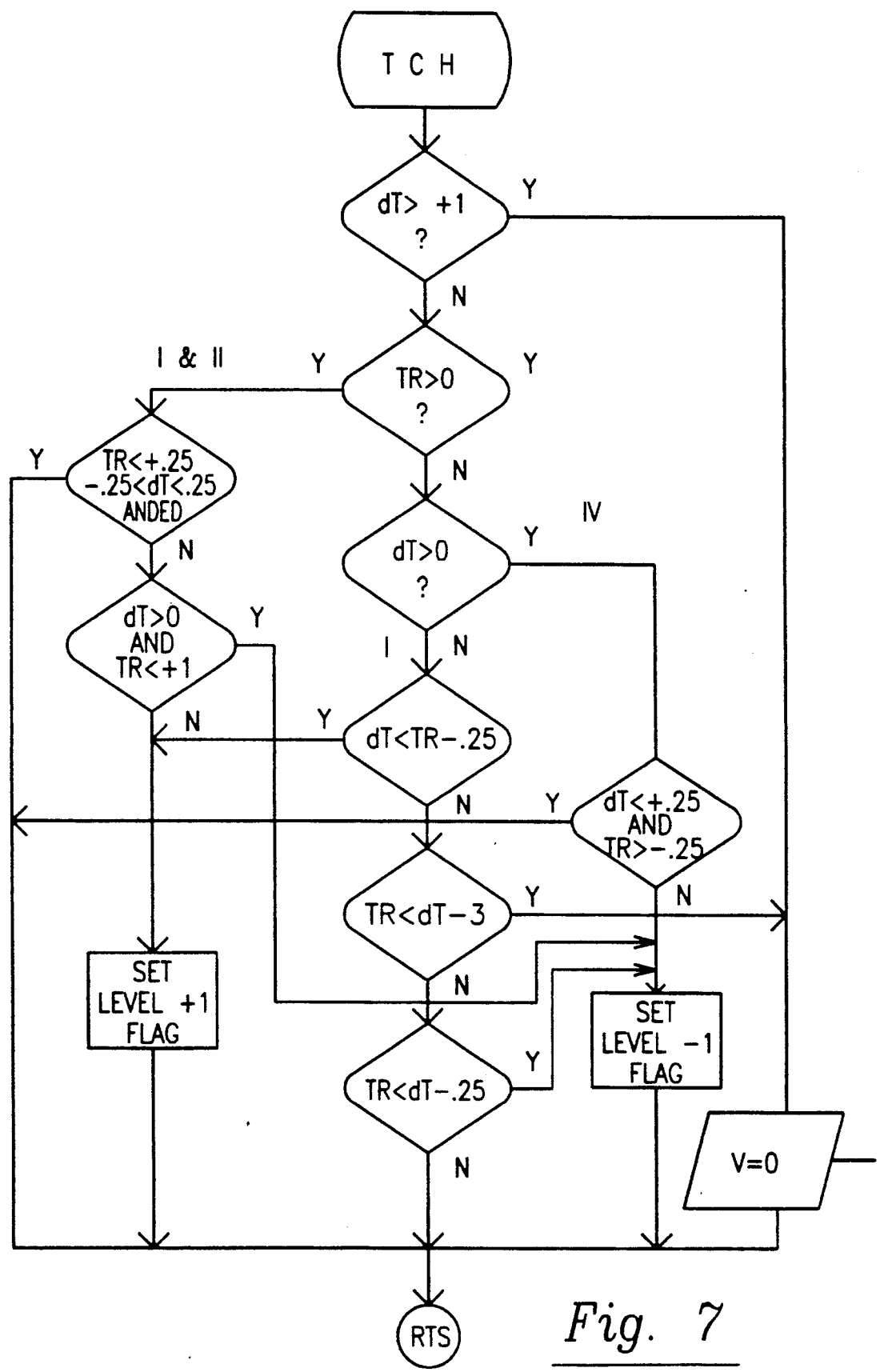
FIG. 7 is depicts the operational sequence of the logic circuitry for generating the temperature control signal when operating in the HEAT state signal generation in the solution mode.
Figure 8:
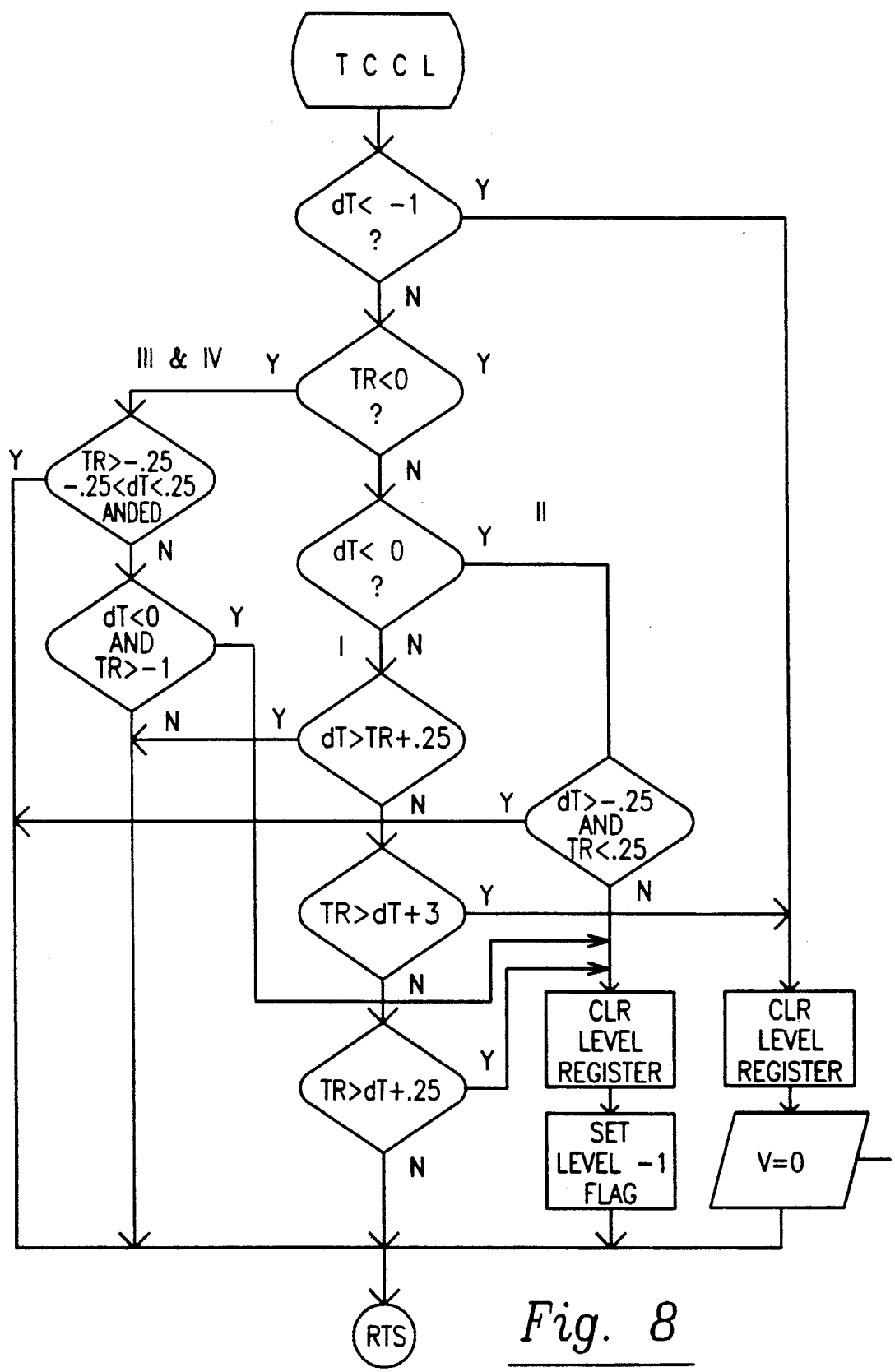
FIG. 8 depicts the operational sequence of the logic circuitry of the COOL state signal limit when operating in the remote sensor mode.
Figure 9:
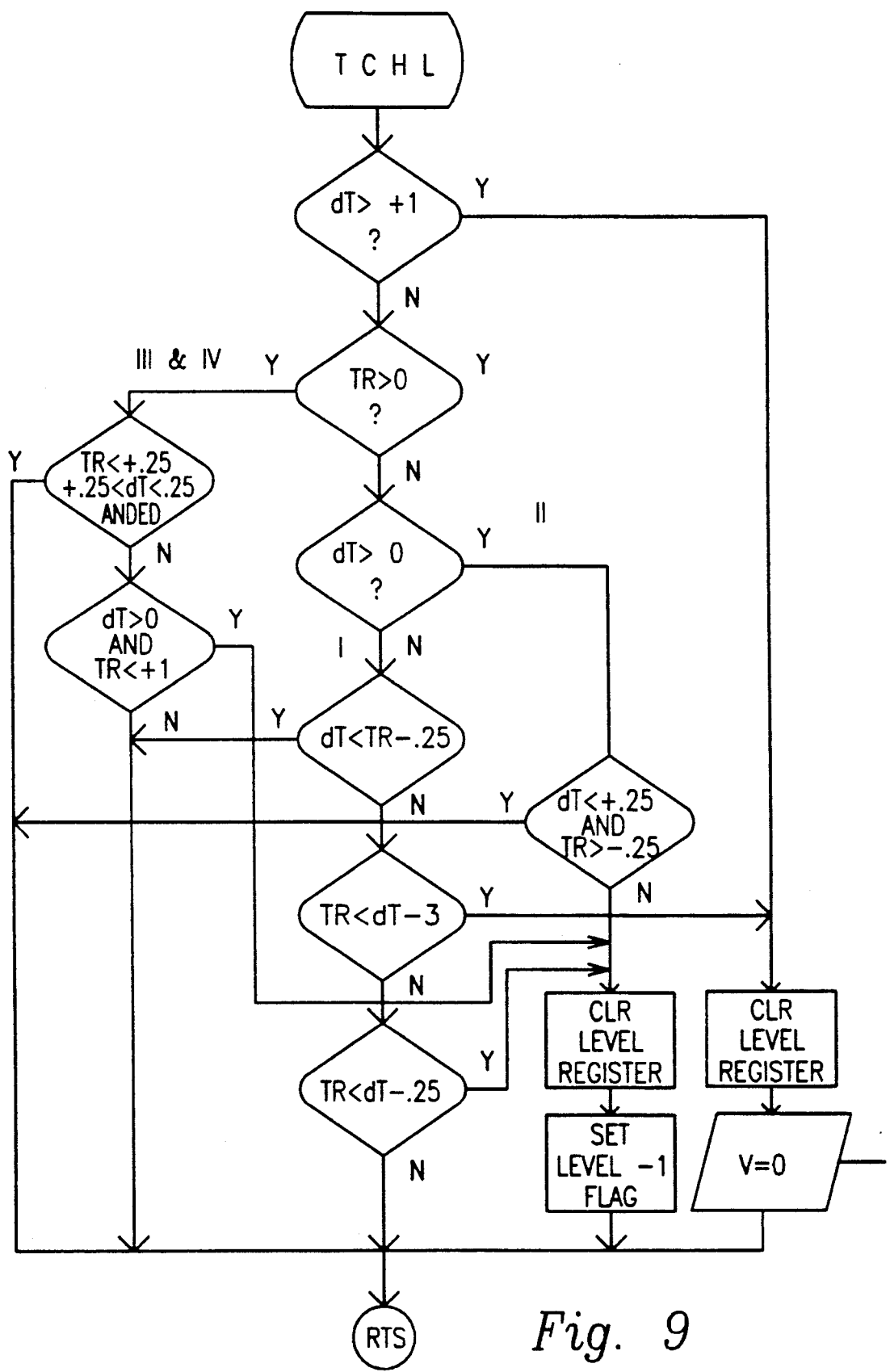
FIG. 9 depicts the operational sequence of the logic circuitry of the HEAT state signal limit when operating in the remote sensor mode.

The linearization of the temperature produces actual temperatures in degrees Fahrenheit. The comparator 36 computes dT and Tr according to the operation mode of Solution or Sensor for the HEAT/COOL routine. The logic circuitry computes the position of bipolar switching section 48 as shown in FIG. 5. HEAT/COOL state is stored in shaft memory 40. The selected sensed temperature is determined by the sensor selector mode control 24. dT and Tr are calculated for the COOL and HEAT state as shown in FIGS. 6 and 7 respectively. In addition, when in the Sensor mode, the minimum and maximum solution temperatures are limited by the logic sequence for COOL and HEAT states shown in FIGS. 8 and 9 respectively. If in the heat mode the temperature control subroutine for HEAT(TCH) is performed and the dT and Tr are computed for the temperature limit control (TCHL) routine that does not let the solution temperature go above 105 degrees Fahrenheit. The temperature control logic (TCC and TCH) control, the power supply levels by making a determination if the level should be increased, decreased or turned off and the setting of the appropriate flag in the level register. This is done for two reasons: 1) to minimize code, 2) to allow the limit subroutines (TCCL and TCHL) to modify the level flags if the solution temperature limits (40 and 105) are approached in the sensor mode. The normal temperature control subroutines (TCC and TCH) can set increase or decrease flags and turn off voltage and the temperature limit subroutines can only change the operation by setting the decrease flag or turning off the voltage. Therefore, the limit logic only keep the solution in the 40 to 105 degree bounds and the over all control requires the normal temperature control subroutines to request the increase in power supply voltage levels. Next the −1 level flag is checked, if set, and if the present level is not 0 and the tv timer is 0 then the multilevel power supply control means 52 will be reduced by one voltage level and the tv timer will be re-initialized with the starting count. If the +1 level flag is set and if the present level is not 3 and timer tv is 0 then the multilevel power supply control means 52 will be increased by one voltage level and the tv timer will be re-initialized with the starting count. When no level flags were set or the levels have been adjusted, the tv timer will be decremented with a minimum count of 0 to allow the time delay in the control dynamics. From here the interrupt routine continues.

The operation of the HEAT/COOL state control means 60 is best understood with reference to FIG. 5 to determine whether the dynamic temperature control 10 should be heating or cooling and set a memory register flag with the outcome. The temperature differential dT is checked to determine if it is less than −3 and if so then if the current mode is cool then switch to heat mode (set heat flat) and exit. If not less than −3 and if dT is more than +3 degrees and the mode is heat then switch to the cool mode (set cool flag) and exit. If dT is greater than −3 and less than +3 then, no change in mode and exit.

The most effective way to describe system operation is to show the dynamic switch points using phase plane diagrams. It is necessary to show two diagrams, one for the COOL state of operation and one for the HEAT state of operation since this eliminates one half of the states. This is accomplished by the COOL phase plane diagram, FIG. 10, using only levels 0 through +3 and the HEAT phase plane diagram, FIG. 11, using only levels 0 through −3.

The quadrants of the phase plane diagrams represent:

| | QUADRANT DESCRIPTION |
|---|---|
| I | Over Set Point Rate decreasing (cooling down) |
| II | Under Set Point Rate decreasing (cooling down) |
| III | Under Set Point Rate increasing (heating up) |
| IV | Under Set Point Rate increasing (heating up) |

Figure 10:
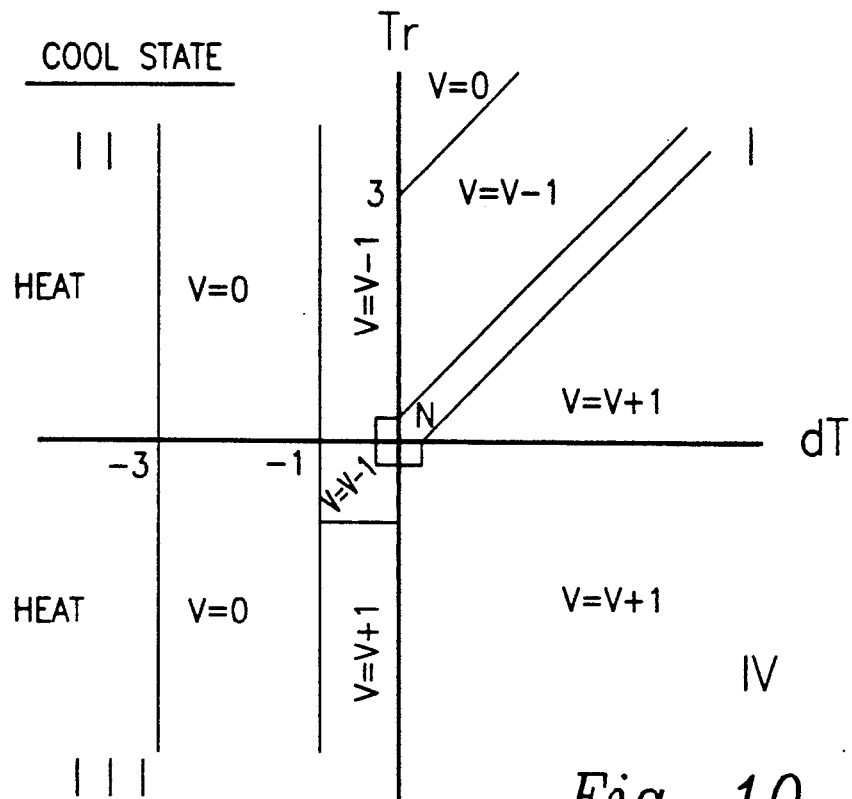
FIG. 10 is the COOL state phase plain diagram.

The COOL phase plane diagram, FIG. 10, shows that at power on with a COOL state set point dT is larger and Tr is zero. The power supply 52 in incremented up in voltage at tu (15 second) intervals until level 3 is reached in quadrant I (dT+ and Tr+). As dT decreases and Tr increases there is a point where the dynamic temperature control 10 may under shoot. Therefore, the dynamic temperature control 10 has a region where the trajectory will cause the power supply 52 to lower the voltage level. If the rate is at minimum intercept, then the level will stay the same (region N). If Tr becomes larger than Dt +3 degrees, then the power supply 52 voltage will be turned off.

There is a region around the origin where there will be no change in voltage level in quadrants II, III and IV. This is the hysteresis region of the modified first order servo control loop.

In quadrants II and III the HEAT/COOL state will be switched to HEAT if dT is less than −3 degrees as described in the HEAT/COOL procedure. If dT is less than −1 degree, then the voltage will be turned off to stop the cooling.

In quadrant II when dT or Tr is greater than 0.25 degrees the voltage will be decreased to slow down the cooling.

In quadrant III when dT or Tr is less than −0.25 degrees and Tr and dT are greater than −1 degrees decrease the voltage level and when dT is greater than −1 degrees and Tr is less than −1 degrees/unit then the voltage level will be increased to provide more cooling power.

In quadrant IV when dT is greater than 0.25 degrees or Tr is less than −0.25 degrees/tu the voltage level will be increased to provide more cooling power.

Figure 11:
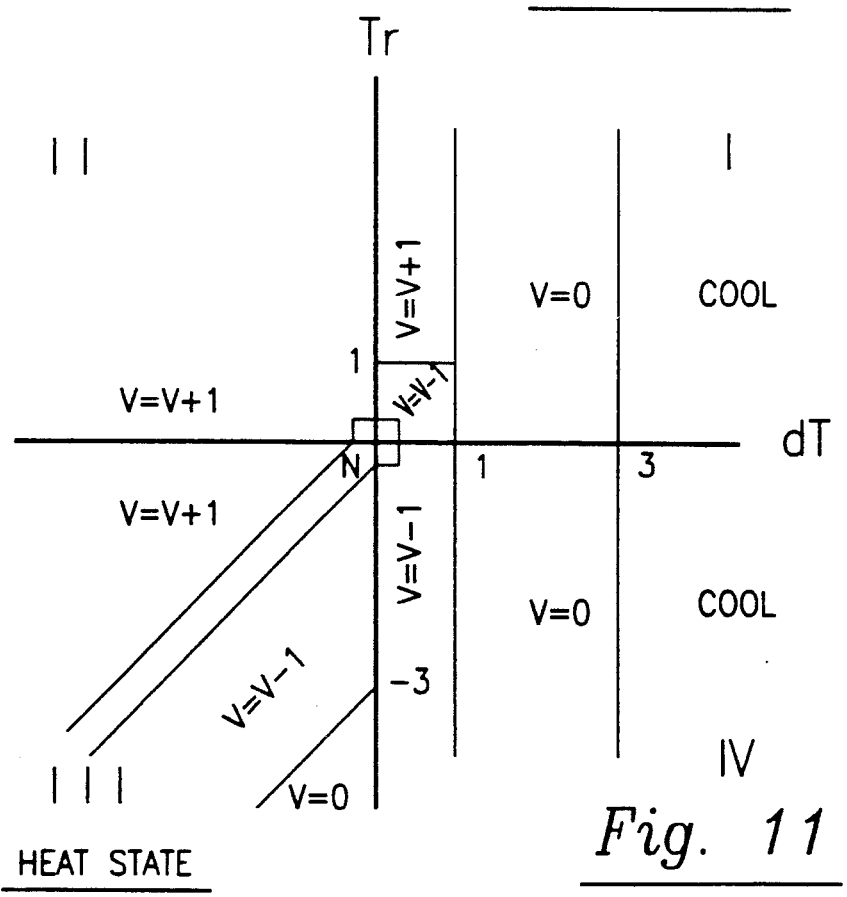
FIG. 11 is the HEAT state phase plain diagram.

As shown in FIG. 11, the phase plane diagram for heating is the exact negative of the cooling diagram. The usual starting point would be from dT axis of quadrant three (dT− and Tr−). The starting point is when dT is a very negative number and Tr zero. As the system heats up dT will approach zero and the magnitude of Tr will increase and then decrease using the criteria of the controls similar to the COOL procedure.

As previously suggested, FIGS. 6 and 7 implement the logic circuitry for the phase plane diagrams. The limit controls (TCCL and TCHL) are the same except there is no need for an increment level flag function and the limit routine decrement request or zero level output clears any level request from the normal control routines.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A dynamic temperature control for use with a heating and/or cooling system including at least one temperature sensor to selectively generate one of a plurality of discrete predetermined direct current voltage level temperature control signals for use with a fluid circulating system operable in a heating or cooling state including a control panel to select the system operating parameters including operating temperature of the fluid and at least one temperature sensor, said dynamic temperature control comprises logic circuitry to receive temperature input signals from the control panel and temperature sensor and to generate one of said plurality of discrete predetermined direct current voltage level temperature control signals proportional to the difference between the input signals from the control panel and the temperature sensor and the rate of change of the fluid temperature to control the operating temperature of the fluid circulated through the fluid circulating system.

2. A dynamic temperature control for use with a heating and/or cooling system including at least one temperature sensor to selectively generate one of a plurality of discrete voltage level temperature control signals for use with a fluid circulating system selectively operable in a first or second selected operating mode including at least one thermal module operable in heating or cooling state to monitor and control the temperature of fluid circulated through a remote liquid circulation manifold comprising a control panel to select the system operating parameters including a selected operating temperature set point and a first sensor to sense the temperature of the fluid including means to generate a first temperature signal corresponding to the temperature of the fluid and a second sensor displaced adjacent the remote liquid circulation manifold including means to generate a second temperature signal corresponding to the temperature adjacent the remote liquid circulation manifold and a micro control including logic circuitry to receive signals from said control panel and said first and second temperature signals from said first and second temperature sensors respectively and to selectively generate thermal module control signals to control the heating or cooling of the thermal module by comparing said selected operating temperature set point with the temperature sensed by said first sensor when operating in said first selected operating mode to selectively generate said thermal module control signals and by comparing said selected operating temperature set point with the temperature sensed by said second sensor when operating in said second selected operating mode to selectively generate said thermal module control signals proportional to the difference between the selected operative temperature set point and the second temperature and the rate of change of the liquid, said temperature controlled fluid circulating system further operable in an alternate operating mode wherein said logic circuitry further includes an alternate operating mode logic means such that said temperature controlled fluid circulation system operates in said alternate operating mode when in said second selected operating mode and said second temperature signal exceeds a first predetermined temperature range.

* * * * *